United States Patent [19]

Yonezawa et al.

[11] 4,362,857

[45] Dec. 7, 1982

[54] METHOD OF PRODUCING POLYETHER RESINS USING PHASE TRANSFER CATALYSTS

[75] Inventors: Kazuya Yonezawa; Junichi Ishizu, both of Kobe; Miyuki Matsuura, Nishinomiya, all of Japan

[73] Assignee: Kanegafuchi Kagaku Kogyo Kabushiki Kaisha, Osaka, Japan

[21] Appl. No.: 199,421

[22] Filed: Oct. 22, 1980

[30] Foreign Application Priority Data

Oct. 29, 1979 [JP] Japan .................... 54-140367

[51] Int. Cl.$^3$ .................................. C08G 65/40
[52] U.S. Cl. ........................... 528/174; 528/219
[58] Field of Search ....................... 528/219, 174

[56] References Cited

U.S. PATENT DOCUMENTS

| | | | |
|---|---|---|---|
| 2,058,510 | 10/1936 | Rothrock | 528/219 |
| 2,060,715 | 11/1936 | Arvin | 528/219 |
| 2,060,716 | 11/1936 | Arvin | 528/219 |
| 2,062,676 | 12/1936 | Reiff | 528/219 |
| 2,075,333 | 3/1937 | Arvin | 528/219 |
| 2,100,377 | 11/1937 | Brubaker | 528/219 |
| 3,576,788 | 4/1971 | Harris et al. | 528/219 |
| 3,761,449 | 9/1973 | Kaufman | 528/219 |

FOREIGN PATENT DOCUMENTS

| | | | |
|---|---|---|---|
| 702688 | 1/1965 | Canada | 528/219 |
| 433452 | 8/1935 | United Kingdom | 528/219 |
| 472492 | 9/1937 | United Kingdom | 528/219 |
| 472835 | 9/1937 | United Kingdom | 528/219 |
| 472913 | 10/1937 | United Kingdom | 528/219 |

*Primary Examiner*—Lester L. Lee
*Attorney, Agent, or Firm*—Moonray Kojima

[57] ABSTRACT

A novel polyether resin having the repeating units of the formula:

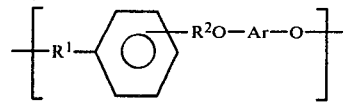

wherein Ar is a divalent aromatic group, and $R^1$ and $R^2$ are divalent aliphatic hydrocarbon groups having 1 to 4 carbon atoms, and method of producing same wherein alkylene dihalide and alkali metal salts of bifunctional phenols are reacted in the presence of a phase transfer catalyst. The novel resin may be used, for example, as a film sheet or as an agent for improving the impact strength of polystyrene.

7 Claims, 3 Drawing Figures

METHOD OF PRODUCING POLYETHER RESINS USING PHASE TRANSFER CATALYSTS

BACKGROUND OF THE INVENTION

This invention relates to a novel polyether resin and method of producing same.

It is known that polyether resins may be synthesized by reacting alkali salts of phenols and halides. However, in the prior art, the known methods involve using anhydrous substances and reaction was conducted in aprotic polar solvents having high boiling points, such as dimethylformamide. Thus, disadvantageously, it was necessary to use additional steps and time to isolate and purify the resulting polymers after completion of the reaction. Because of the necessity for removing by-produced salts and because of the problem regarding recovery of aprotic polar solvents having high boiling points, conventional prior methods have certain deficiencies and disadvantages, such as poor productivity and high costs. Thus, there exists in the prior art a need for a manufacturing process for producing polyether resins which does not use anhydrous substances and aprotic polar solvents to produce the resin.

SUMMARY OF THE INVENTION

Accordingly, an object of the invention is to eliminate or reduce the aforementioned and other disadvantages and deficiencies of the prior art.

Another object is to provide a method of manufacturing polyether resins which do not require undesirable steps of isolating and purifying the products after reaction.

A further object is to produce a novel polyether resin.

The foregoing and other objects are attained in the inventive novel polyether polymer produced by reacting an alkali metal salt of bifunctional phenols of the general formula:

$$MO-Ar-MO'$$

wherein M and M' represent alkali metals and Ar is a divalent aromatic group, such as having 6 to 30 carbon atoms; and alkylene dihalide having the general formula:

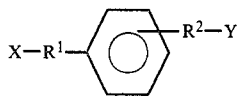

wherein $R^1$ and $R^2$ are divalent aliphatic hydrocarbon groups having 1 to 4 carbon atoms, such as $-CH_2-$; $-C_2H_4-$; $-C_3H_6-$; or $-C_4H_8-$; and using a phase transfer catalyst. The reaction may be carried out using an organic solvent. The metal salt may be prepared by preferably dissolving bifunctional phenols in aqueous solution of caustic soda or caustic potash.

Since phase transfer reaction is employed, water may be used as one component of the solvents used in the invention. Thus, added steps to remove by-produced products are not necessary. Moreover, such method makes it possible to use less expensive solvents having low boiling points, such as halogenated hydrocarbons or aromatic hydrocarbons. Further, when suitable solvents such as xylene, toluene or chlorobenzene, are used, it is possible to cause the resulting polymer to be deposited out from the reaction system. Thus, advantageously, in such cases, purification and isolation of the product are simplified.

A feature of the invention is the preferable dissolving of bifunctional phenols in an aqueous solution of caustic soda or caustic potash and the reaction of same with alkylene dihalide in the presence of a phase transfer catalyst to produce a novel polyether polymer.

Another feature is the novel polyether polymer having the repeating units of the formula:

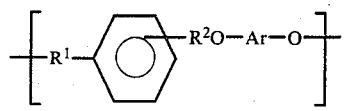

wherein $R^1$ and $R^2$ are divalent aliphatic hydrogen group having 1 to 4 carbon atoms and Ar is a divalent aromatic group.

A further feature is the use of a phase transfer catalyst, being preferably an oil soluble quaternary amonium salt, a quaternary phosphonium salt, a crown ether or mixtures thereof.

Another feature is the reaction of metal salts of bifunctional phenols and alkylene dihalides in the presence of phase transfer catalyst and water.

A further feature is the use of organic solvents preferably toluene, xylene, methylen chloride, chlorobenzene or o-dichlorobenzene.

Another feature is the use of metal salts of the formula:

$$MO-Ar-OM'$$

wherein M and M' represent alkali metals and Ar is a divalent aromatic group preferably having 6 to 30 carbon atoms.

Other features are the use of preferably 0.9 to 1.2 mols of bifunctional phenol compound per mol of alkylene dihalide and preferably from 0.001 to 0.20 mole, and more preferably 0.01 to 0.10 mol of a phase transfer catalyst, thereby to produce a novel polyether resin having an intrinsic viscosity preferably of between 0.1 to 1.0 and more preferably of 0.3 or more.

DETAILED DESCRIPTION OF PREFERRED EMBODIMENTS

Figure 1:
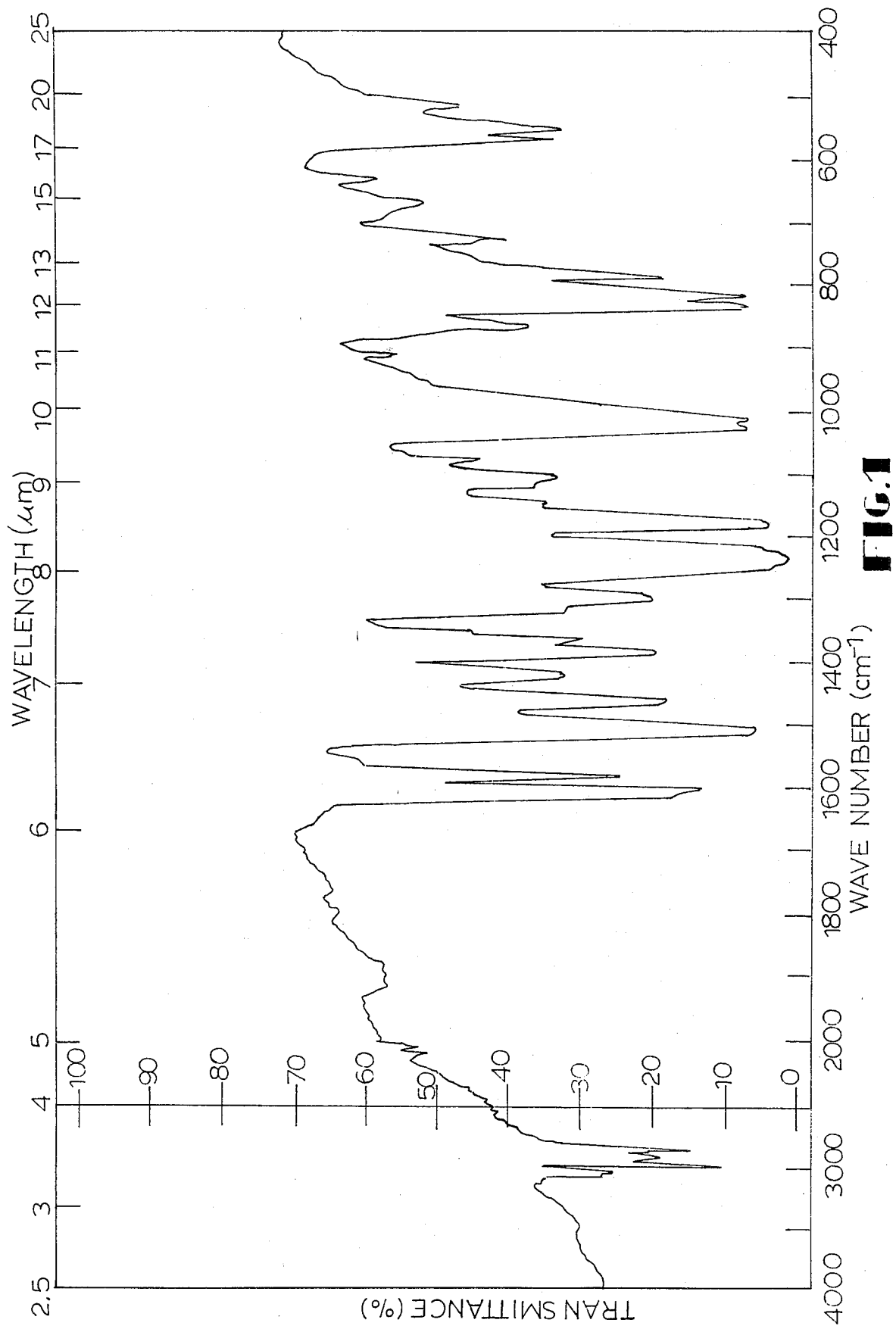
FIG. 1 depicts an infrared absorption spectrum of the specimen produced in Example 1.

As previously discussed, the novel polyether polymer is produced by the reaction of a metal alkali salt of a bifunctional phenol with alkylene dihalide in the presence of a phase transfer catalyst. The novel polyether resin has repeating units of the formula:

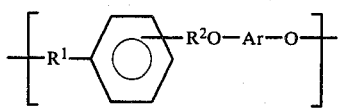

wherein R¹ and R² are divalent aliphatic hydrocarbon groups having 1 to 4 carbon atoms and Ar is a divalent aromatic group having preferably 6 to 30 carbon atoms. The Ar preferably has the formula:

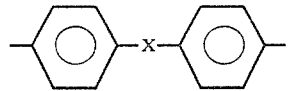

wherein X is a member selected from the group consisting of

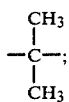

—SO₂—; —CH₂—; —O—; and —S—. The polyether resin may have at least one nucleus substituted radical selected from halogen, lower alkyl group having 1 to 5 carbon atoms, substituted alkyl groups or mixtures thereof.

The alkylene dihalide preferably has the general formula:

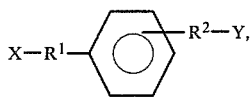

wherein R¹ and R² are divalent aliphatic hydrocarbons having 1 to 4 carbon atoms, such as —CH₂—; —C₂H₄—; —C₃H₆—; or —C₄H₈—, and X and Y are halogens.

Among the dihalides used in the invention, xylylene dihalide is preferable as being conveniently of low cost, low temperature of reaction and high heat resistance of the resulting polymer. Although, o-, m-, or p-xylylene dichloride or xylylene dibromide can be used effectively solely or in combination as a mixture, it is preferable to use p-xylylene dichloride or xylylene dibromide in an amount of at least 60 mole percent or more in view of the properties of the polyether resin obtained. On the other hand, ortho-alkylene dihalide should be used in an amount of 10 mole percent or less against para-alkylene dihalide.

Metallic salts of bifunctional phenol compounds to be used in the invention have the general formula:

MO—Ar—OM' wherein M and M' represent alkali metals and Ar is a divalent aromatic group having preferably 6 to 30 carbon atoms. These phenol compounds have the general formula:

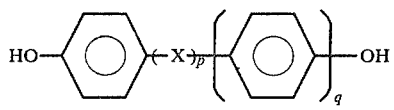

wherein X is

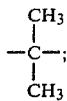

—SO₂—; —CH₂—; —O—; or —S—; and wherein "p" and "q" are each integers 0 or 1. Examples of such phenol compounds are resorcinol; hydroquinone, such as of the structural formula

4,4'-dihydroxydiphenyl, such as of the structural formula

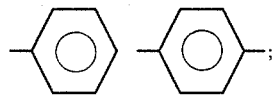

or their bifunctional phenol compounds; compounds of 1 to 4 chlorine or bromine atoms or 1 to 4 hydrocarbon atoms or substituted hydrocarbon groups (for example, methyl group, ethyl group, propyl group or butyl group) in their aromatic group. The foregoing can be used singly or in combination. Preferred are such phenol compounds as bisphenol A (2,2-bis(hydroxyphenyl)-propane); bisphenol S (bis(4-hydroxyphenyl)-sulfone); bisphenyl F (bis(3.5-dimethyl-4-hydroxyphenyl)-methane); 4,4'dihydroxydiphenyl and hydroquinone.

It is also possible to use phenol compounds having more than two hydroxyl groups. When the term bifunctional phenol compounds is used herein, it shall include mixtures of polyfunctional phenol compounds of not less than 90 mol percent bifunctional phenol compounds and not more than 10 mole percent of tri or tetra functional phenol compounds.

Both the alkylene dihalides and the bifunctional phenols of the present invention may contain other groups located on the aromatic nuclei, such as halogen, lower alkyl group having 1 to 5 carbon atoms and substituted alkyl groups.

It is desirable to employ the aformentioned bifunctional phenol compounds in amounts of from 0.9 to 1.2 mols per mol of alkylene dihalide. When the bifunctional phenol compounds are used in a ratio of less than 0.9 mole, resins with low degree of polymerization are produced. When the ratio is higher than 1.2 moles, then excess phenol compounds remain after the completion of the reaction and thus becomes uneconomical.

It is preferable to obtain the metal alkali salts of the phenol compounds by first dissolving them in excess aqueous solution of caustic soda or caustic potash, and then reacting them with the the alkylene dihalide in the presence of the phase transfer catalyst.

The reaction is preferably carried out using an organic solvent. Examples of such solvents are halogenated hydrocarbons, such as methylene chloride, chlorobenzene, and orthodichlorobenzene; and aromatic hydrocarbons, such as toluene and xylene. These can be employed singly or in combination of two or more.

The intrinsic viscosity $\eta$ of the resulting polymer can be suitably adjusted by changing kinds and amounts, i.e. mol ratio, of the compound to be reacted. Usually, products having an intrinsic viscosity in the range of 0.1 to 1.0 are easily obtained and products with an intrinsic viscosity of 0.3 or more are preferred from the standpoint of properties of the products, particular that of thermal resistance.

Phase transfer catalysts are used as the catalyst in the invention. Examples of these are oil soluble ammonium salts, such as $(CH_3)_4NBr$; $(C_3H_7)_4NBr$; $(C_4H_9)_4NBr$; $(C_4H_9)_4NI$; $(C_8H_{17})_3NCH_3Cl$; $C_6H_5CH_2N(C_2H_5)_3Br$; $C_5H_5NC_{12}H_{25}Br$; $C_5H_5NC_{12}H_{25}Cl$; $C_{10}H_{21}N(CH_3)_3Cl$; $C_{12}H_{25}N(CH_3)_3Cl$; $C_{16}H_{33}N(CH_3)_3Cl$; $C_{16}H_{33}N(CH_3)_3Br$; and $C_1H_{33}N(CH_3)_3OH$; quaternary phosphonium salts such as $(C_6H_5)_4PCl$; $(C_6H_5)_3PCH_3I$; $(C_4H_9)_4PCl$ and $(C_6H_5)_4AsCl$; and crown ether such as Dicyclohexyl-18-Crown-g; Dicyclohexyl-24-Crown-8; 15-Crown-5; 18-Crown-6; Dibenzo-18-Crown-6; Dibenzo-24-Crown-8; Diaza-15-Crown and diaza-18-Crown. The amount of catalyst to be used is preferably in the range of 0.1 to 20 mole percent, and more preferably 1 to 10 mole percent of said alkylene dihalide.

A system using the water process does not work without use of the phase transfer catalyst. On the other hand, a non-water process such as in the prior art has many disadvantages such as those listed hereinabove.

The polymerization reaction in the presence of these phase transfer catalysts can be usually carried out at any temperature ranging from 0° to 100° C. The pressure may be normal pressure. The reaction may be accomplished in 5 to 20 hours, under that temperature conditions just mentioned.

Although it is possible to manufacture polyether polymers by reacting anhydrous alkali metal salts of bifunctional phenol compounds with xylylene dihalide in aprotic polar solvent, such as dimethylformamide, the amount of labor, added steps and added time required to remove and isolate the by-products, and to isolate and purify the resulting polymers make such method disadvantageous as above discussed. Thus, the inventive method wherein the phase transfer reaction, wherein water may be present, is used, is more convenient and effective and does not produce the disadvantages and deficiencies such as above discussed.

The polymers of the present invention have excellent properties, such as thermal resistance due to their structure, and can be used, for example, for various purposes, such as in a film sheet, or as an agent for improving impact strength of polystyrene.

The following are actual examples of the invention. These examples are for illustrative purposes and are not to be construed to be limiting of the invention.

EXAMPLE 1

Under a flow of nitrogen, 10 m mole of p-xylylene dichloride was dissolved in 30 ml of chlorobenzene. To this mixture, 0.3 m mole of trioctylmethylammonium chloride was added. The nitrogen was used to prevent oxidation of the phenol, but was not essential.

11 m mole of bisphenol-A (2,2-bis(hydroxyphenyl)propane) was dissolved in 30 ml of 1 N aqueous solution of caustic soda. The resulting solution was added to the above solution. The resultant mixture was then reacted for 3 hours at 80° C., and then for another 3 hours at 100° C. After the reaction was completed, the reacted solution was cooled to room temperature and the obtained polyether resin was deposited out. This polymer was separated by filtering, washed with methanol hydrochloric acid, and then washed with water, and then dried. The dried polymer had a melting point of 208° C.; and a glass transition temperature ($T_g$) of 100° C. according to the VIBRON Test (using viscoelasticity spectrometer). The obtained polymer was found to be polyether judging from the reaction composition and its structure was defined on the basis of infrared spectrum and elementary analysis. FIG. 1 shows the infrared absorption spectrum. The intrinsic viscosity $\eta$ of the polymer determined at 30° C. in a solvent dimethylacetamide, was 0.67.

Elementary Analysis: Calculated: C=83.60%; H=6.71%: Found: C=83.39%; H=6.58%.

EXAMPLES 2 and 3

By carrying out the same reaction as in Example 1, except that instead of chlorobenzene as solvent, toluene and xylene were used in sperate tests as the solvent, and the same polymer was obtained as in Example 1.

EXAMPLE 4

Under a flow of nitrogen, 10 m mole of p-xylylene dichloride was dissolved in 30 ml of xylene. To this mixture, 0.3 m mol of trioctyl methylammonium chloride was added.

11 m mole of bisphenol-S (bis-(4-hydroxyphenyl)sulfone) was dissolved in 30 ml of 1 N aqueous solution of caustic soda and the resulting solution was added to the above mentioned mixture. The reaction was carried out for 6 hours at 80° C. and the resulting polymer was deposited out. The polymer was separated by filtering, then washed with hydrochloric acid-methanol, and then washed with water, and then dried under reduced pressure. The values obtained from elementary analysis of the polymer was as follows:

Elementary Analysis: Calculated: C=68.17%; H=4.58%; Found: C=67.89%; H=4.59%.

Figure 2:
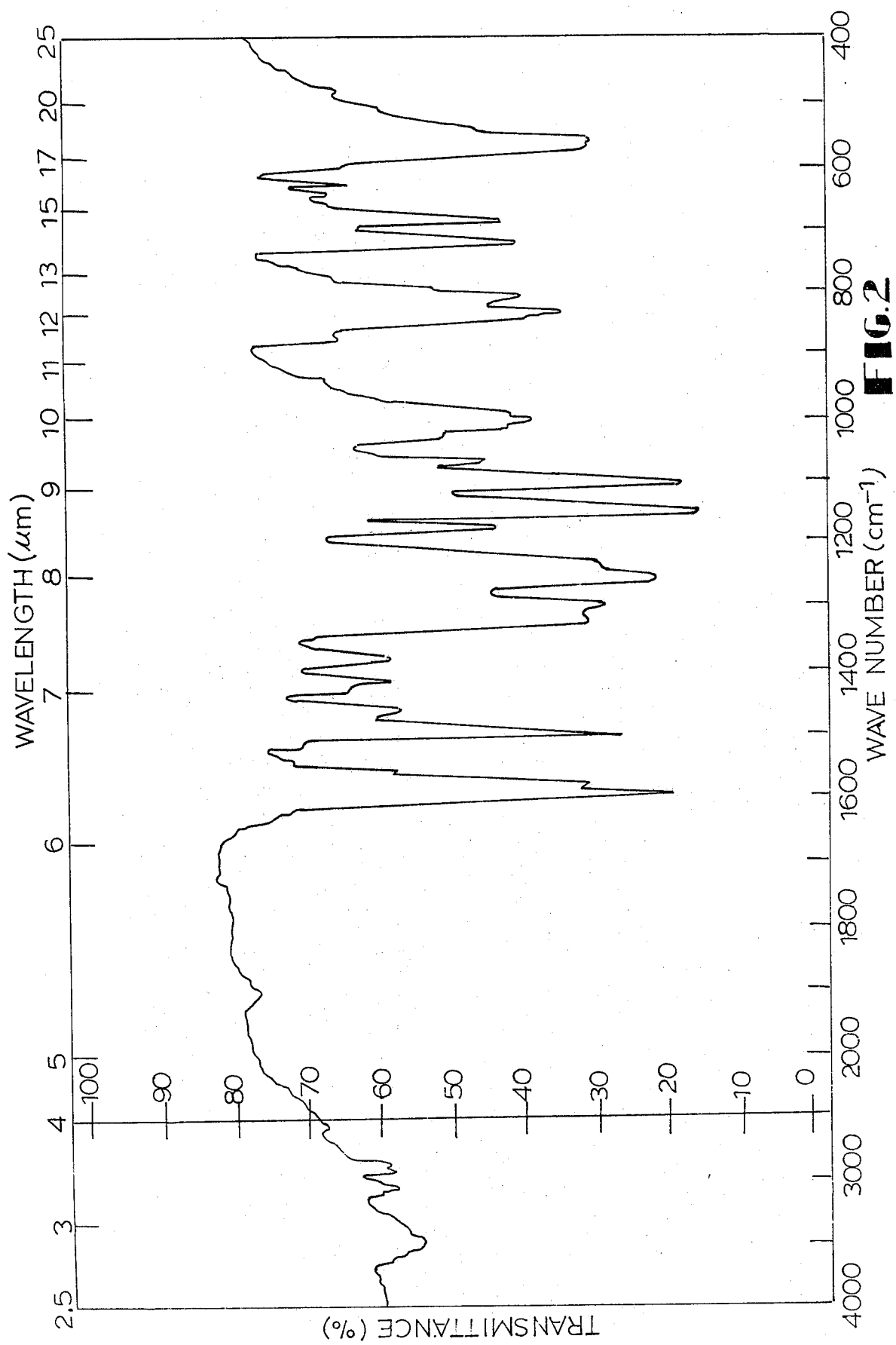
FIG. 2 depicts an infrared absorption spectrum of the specimen produced in Example 4.

The intrinsic viscosity $\eta$ determined at 30° C. in a solvent of dimethylacetamide, was 0.34. FIG. 2 shows the infrared absorption spectrum of the obtained polymer, which proved to be polyether resin.

EXAMPLE 5

Under a flow of nitrogen, 10 m mole of p-xylylene dichloride was dissolved in 30 m mole of xylene. To this mixture, 0.3 m mole of trioctyl methylammonium chloride was added.

A mixture of 7 m mole of bisphenol-A and 3 m mole of bisphenol-S were dissolved in 30 ml of 1 N aqueous solution of caustic soda. The resulting solution was added to the above mixture. The resulting mixture was reacted for 3 hours at 80° C. at first, and then for another 3 hours at 100° C., and then cooled to room temperature. The obtained polymer was deposited out. The polymer was then separated by filtering, then washed and dried as in the previous examples.

Figure 3:
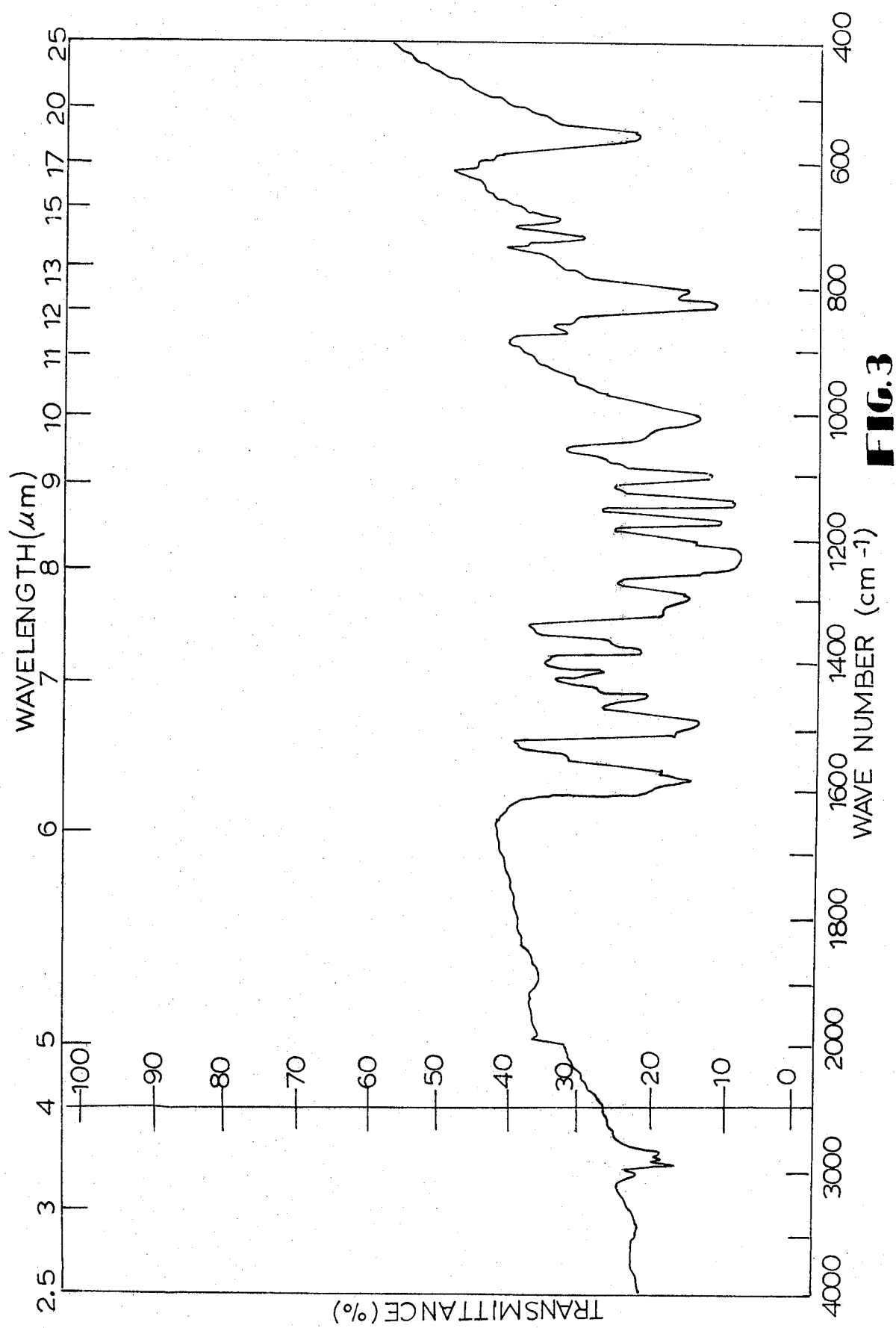
FIG. 3 depicts an infrared absorption spectrum of the specimen produced in Example 5.

The melting point of the polymer was 165° C. Its infrared absorption spectrum is shown in FIG. 3. It became clear from data of elementary analysis and the spectrum, that the polymer contained bisphenol-A and bisphenol-B units in the amount of 60.5 mole% and 39.5 mole%, respectively. Elementary Analysis found: C,77.33%; H,5.79%.

EXAMPLE 6

In each of the foregoing examples, the caustic soda was replaced with caustic potash. The same results were obtained in each case.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A method of manufacturing polymers having the repeating units of the formula:

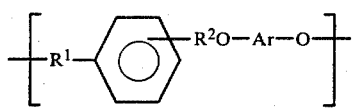

which method comprises reacting alkali metal salts of bifunctional phenols of the formula:

wherein M and M' are alkali metals and Ar is a divalent aromatic group having 6 to 30 carbon atoms, with an alkylene dihalide having the formula:

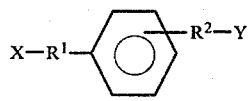

wherein X and Y are halogens, and $R^1$ and $R^2$ are divalent aliphatic hydrocarbon groups having from 1 to 4 carbon atoms and Ar is a divalent aromatic group having 6 to 30 carbon atoms, in the presence of a phase transfer catalyst.

2. The method of claim 1, wherein said phase transfer catalyst is selected from the group consisting of oil soluble quaternary ammonium salt, a quaternary phosphonium salt, a crown ether, and mixtures thereof.

3. The method of claim 1, wherein said alkylene dihalide is xylylene dihalide.

4. The method of claim 1, wherein said bifunctional phenol compound is used in an amount of from 0.9 to 1.2 mols per mole of said alkylene dihalide.

5. The method of claim 1, wherein said phase transfer catalyst is used in an amount of from 0.001 to 0.2 mole per mole of said alkylene dihalide.

6. The method of claim 5, wherein said amount is between 0.01 to 0.10 mole per mole of said alkylene dihalide.

7. A method of manufacturing polyether polymers having an intrinsic viscosity of at least 0.1 and having the repeating units of the formula:

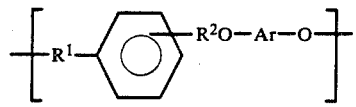

wherein $R^1$ and $R^2$ are divalent aliphatic hydrocarbon groups having 1 to 4 carbon atoms and Ar is a divalent aromatic group having 6 to 30 carbon atoms; said method comprising the steps of (A) dissolving 0.9 to 1.2 mole of bifunctional phenol compound of the formula:

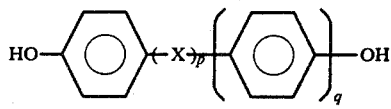

wherein X is

—SO$_2$—; —CH$_2$—; —O—; or —S—; "p" and "q" are each integer 0 or 1; in an aqueous solution of caustic soda or caustic potash;

(B) reacting said mixture of step (A) with 1 mole of alkylene dihalide having the formula:

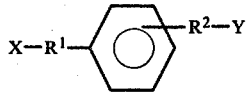

wherein X and Y are halogens, and $R^1$ and $R^2$ are as stated above, and Ar is as stated above; in the presence of 0.001 to 0.20 mole of a phase transfer catalyst selected from the group consisting of oil soluble quaternary ammonium salt, quaternary phosphonium salt; crown ether and mixtures thereof; and utilizing an organic solvent selected from the group consisting of toluene, xylene, methylene chloride, chlorobenzene and orthodichlorobenzene; said reaction being at a temperature of between 0° to 100° C., and for a period of from 5 to 20 hours.

* * * * *